March 20, 1928. 1,663,033
M. W. WHALEN
HUB LINER LUBRICATOR
Filed March 22, 1927
Fig. 1.
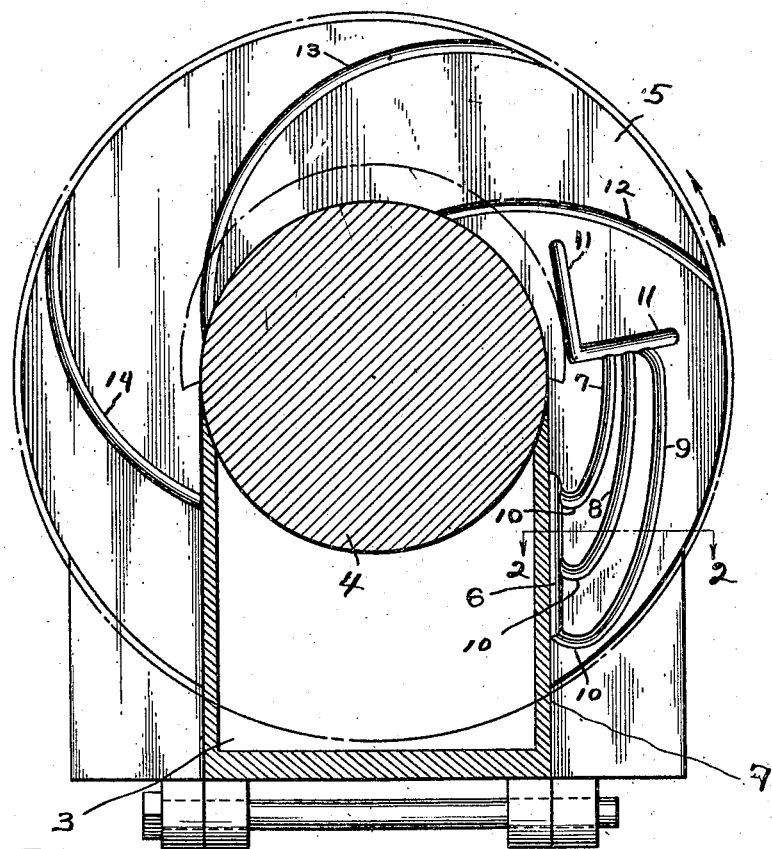
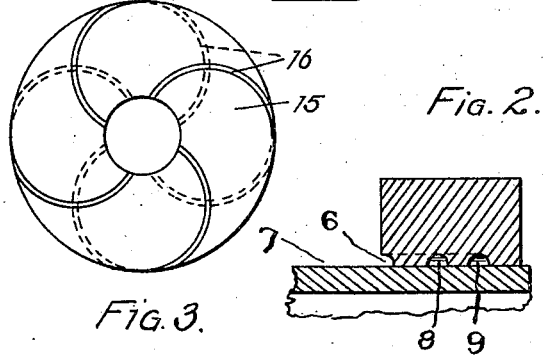
Fig. 2.
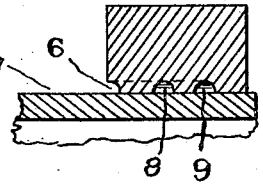
Fig. 3.
Inventor
Milton W. Whalen Patented Mar. 20, 1928.

1,663,033

UNITED STATES PATENT OFFICE.

MILTON W. WHALEN, OF BALTIMORE, MARYLAND.

HUB-LINER LUBRICATOR.

Application filed March 22, 1927. Serial No. 177,373.

My invention is primarily designed for use in lubricating the hub liners of locomotive driving boxes, but of course it is to be understood that it may be used in many different types of bearings and on thrust surfaces.

In the present practice of lubricating hub liners in locomotive drive boxes it is very difficult to maintain proper lubrication as the lubricant is thrown from the bearing by centrifugal force and wasted; when it is taken into consideration that the average driver wheel of a locomotive makes approximately 272 revolutions per minute at a sixty mile speed, the difficulty of maintaining lubrication can be appreciated. I have experimented with several expedients to maintain proper lubrication under these circumstances, and found the means disclosed herein to be the best.

My invention broadly stated consists of means to hold the lubricant on the face of the hub liner against centrifugal and other influences which always tend to throw it from such face.

In the drawings:

Figure 1 is a front elevation of a hub liner, associated with the usual oil cellar and locomotive journal, the journal and a portion of the oil cellar being shown in section.

Figure 2 is a sectional view on the line 2—2, Figure 1, looking in the direction of the arrows.

Figure 3 is a side elevation of a washer.

The reference number 3 designates an oil cellar of standard design, for the journal 4.

The hub liner 5 is of standard size and general construction changed to embody my invention.

According to my invention, I form in the working face of the hub liner a vertically disposed groove, or oil gathering port 6 disposed, substantially, at the inner face 7 of the driving box. The surplus lubricant as it is being carried around on the working face of the liner is caught in the gathering port 6 and thus prevented from being thrown off by centrifugal force and wasted.

Grooves 7, 8, 9, constituting lubricant storage and distributing ports at their lower ends are in constant open communication with the port 6, the lower end portions of said grooves 7, 8, 9, being formed with a dip 10 which functions as reservoirs for lubricant from which the lubricant is drawn up through the ports 7, 8, 9, thus insuring a steady constant supply of lubricant in said ports.

These ports 7, 8, 9, at their upper ends open into a substantially L shaped port 11, the lower leg of which is disposed downwardly in an oblique angle and toward the journal 4, the other leg being inclined to the vertical, whereby a better distribution of the lubricant is obtained.

Grooves 12, 13, 14, constituting lubricant ports, are formed in the working face of the liner and open at each end. These ports 12, 13 and 14 are formed on an arc and their inner ends are directed toward the journal 4.

Assuming that the driver wheel is revolving in the direction of the arrow shown in Figure 1, the surplus lubricant on the face of the wheel hub is gathered in the port 6, and the continued supply of lubricant so gathered forces the lubricant up through the ports 7, 8, 9, into the port 11. At this point there is ordinarily sufficient storage for lubricant, but in the event that there is a surplus of lubricant it is carried from that point on the working faces of the liner and wheel hub, and caught in the grooves 12, 13, 14, from which it is fed, when needed, to said working faces, the surplus being fed through ports 12, 13, 14, to the journal and thence to the oil cellar.

From the above it will be seen that the group of ports are so positioned and of shape that the lubricant is prevented from being wasted by being thrown off said working faces, and that a constant and sufficient amount of lubricant is supplied to said surfaces to insure proper lubrication.

It will be readily seen that in some instances I may form these various ports in the face of a washer and insert that washer between the hub liner and the wheel hub.

In the case of yard engines, by reason of the large amount of work they do in reverse motion, it may be found necessary to duplicate the ports 6, 7, 8 and 9 so that, irrespective of the direction of the movement of the driver wheel, a sufficient amount of lubricant will be fed and maintained between the wheel hub and the hub liner.

In Figure 3 I have shown a washer 15 which may be inserted between the hub liner and the hub of the wheel, said washer being provided with lubricating grooves or ports 16 which function the same as do the ports or grooves 8, 9, 12, 13, 14, above described. This washer is provided with the grooves or ports 16 on both faces in order that the lubricant may be supplied to a sufficient amount irrespective of the direction in which the wheel is moving.

What I claim is:

1. A hub liner having a lubricant collecting vertically disposed port, a series of ports in open communication with said collecting port, a second series of ports in the hub liner open at each end and disposed across the liner to the journal bearing of the liner, all of said ports being formed in and opening on the wheel hub face of the liner.

2. A hub liner having a lubricant collecting port, a series of ports in open communication with and for a portion of their length extending downward and away from said collecting port, a second series of ports in the hub liner open at each end, and extending from the perimeter of the liner to the journal bearing of the liner, said ports all being in and open to the wheel hub face of the liner.

3. A hub liner having a vertically disposed oil port in the inner face of one of its standards on the corner of one of its vertical walls, a series of arcuate ports on the wheel hub face of the liner communicating with said vertical port, and another series of arcuate ports on the wheel hub face of the liner extending from the outer edge of the liner to journal bearing of the liner, all of said ports opening into the face of the said liner.

4. A hub liner having a lubricant collecting vertically disposed port, a series of ports in constant open communication with and for a portion of their length extending downwardly and outwardly from the collecting port, a port in constant open communication with the open ends of said series of ports, and a second series of ports open at each end and extending from the perimeter to the journal bearing of the liner, all of said ports being formed in and opening on the wheel hub face of the liner.

5. In a wheel hub liner a lubricant collecting port, a series of oil ports in constant open communication with said collecting port, and a second series of ports open at each end and extending from the perimeter of the liner to its journal bearing face, said ports being formed in and open to the hub bearing face of the liner.

In testimony whereof I affix my signature.

MILTON W. WHALEN.